US012224468B2

(12) United States Patent
Katikaneni et al.

(10) Patent No.: US 12,224,468 B2
(45) Date of Patent: Feb. 11, 2025

(54) SOLID OXIDE FUEL CELL SYSTEMS AND METHODS OF OPERATING SOLID OXIDE FUEL CELL SYSTEMS

(71) Applicants: Saudi Arabian Oil Company, Dhahran (SA); Korea Advanced Institute of Science and Technology, Daejeon (KR)

(72) Inventors: Sai P. Katikaneni, Dhahran (SA); Joongmyeon Bae, Daejeon (KR); Jiwoo Oh, Daejeon (KR); Minseok Bae, Daejeon (KR); Dongyeon Kim, Daejeon (KR)

(73) Assignees: Saudi Arabian Oil Companay, Dhahran (SA); Korea Advanced Institute of Science and Technology, Daejeon (KR)

( * ) Notice: Subject to any disclaimer, the term of this patent is extended or adjusted under 35 U.S.C. 154(b) by 669 days.

(21) Appl. No.: 17/499,282

(22) Filed: Oct. 12, 2021

(65) Prior Publication Data

US 2023/0116672 A1 Apr. 13, 2023

(51) Int. Cl.
*H01M 8/1213* (2016.01)
*H01M 8/04014* (2016.01)
(Continued)

(52) U.S. Cl.
CPC ..... *H01M 8/1213* (2013.01); *H01M 8/04022* (2013.01); *H01M 8/04089* (2013.01);
(Continued)

(58) Field of Classification Search
None
See application file for complete search history.

(56) References Cited

U.S. PATENT DOCUMENTS 2,642,381 A 6/1953 Dickinson
6,156,084 A 12/2000 Bonville, Jr. et al.
(Continued)

FOREIGN PATENT DOCUMENTS

EP 112613 B1 3/1991
EP 1557897 A1 7/2005
(Continued)

OTHER PUBLICATIONS

Notification of Transmittal of the International Search Report and Written Opinion of the International Searching Authority, or the Declaration dated Feb. 3, 2023 pertaining to International application No. PCT/US2022/046241 filed Oct. 11, 2022.
(Continued)

*Primary Examiner* — Alix E Eggerding
(74) *Attorney, Agent, or Firm* — DINSMORE & SHOHL LLP (57) ABSTRACT

A method of operating a solid oxide fuel cell system may comprise contacting a cathode gas comprising oxygen with a heating element to produce a heated cathode gas, passing the heated cathode gas through a cathode of a solid oxide fuel cell stack to increase the temperature of the solid oxide fuel cell stack to an operation temperature and reduce the oxygen to oxygen anions, and passing an anode gas through an anode of the solid oxide fuel cell stack to initiate the electrochemical oxidation of the oxygen anions within the anode. The passing of the anode gas through the anode of the solid oxide fuel cell stack may be initiated when the solid oxide fuel cell stack is heated to an operational temperature.

16 Claims, 7 Drawing Sheets

(51) Int. Cl.
  *H01M 8/04089*   (2016.01)
  *H01M 8/0612*   (2016.01)
  *H01M 8/2425*   (2016.01)
  *H01M 8/12*    (2016.01)

(52) U.S. Cl.
  CPC ....... *H01M 8/0618* (2013.01); *H01M 8/2425* (2013.01); *H01M 2008/1293* (2013.01)

(56) References Cited

U.S. PATENT DOCUMENTS

| | | | |
|---|---|---|---|
| 6,521,204 | B1 | 2/2003 | Borup et al. |
| 6,635,372 | B2 | 10/2003 | Gittleman |
| 6,994,930 | B1 | 2/2006 | Geisbrecht et al. |
| 7,323,159 | B2 | 1/2008 | Ahluwalia et al. |
| 8,557,189 | B2 | 10/2013 | Roychoudhury et al. |
| 8,563,184 | B2 | 10/2013 | Kaupert et al. |
| 9,199,846 | B2 | 12/2015 | Roychoudhury et al. |
| 9,337,505 | B2 | 5/2016 | Roychoudhury et al. |
| 2002/0007595 | A1 | 1/2002 | Maier-Roeltgen et al. |
| 2004/0194383 | A1 | 10/2004 | Wheat et al. |
| 2005/0019637 | A1* | 1/2005 | Herman .............. H01M 4/9025 429/413 |
| 2009/0165368 | A1 | 7/2009 | Liu et al. |
| 2009/0186246 | A1 | 7/2009 | Heo et al. |
| 2009/0223861 | A1 | 9/2009 | Sugiura et al. |
| 2010/0104897 | A1* | 4/2010 | Bae .............. C01B 3/26 429/425 |
| 2012/0021307 | A1 | 1/2012 | Watanabe et al. |
| 2016/0079622 | A1* | 3/2016 | Yoshimine .......... H01M 8/0618 429/415 |
| 2016/0293984 | A1 | 10/2016 | Kang et al. |
| 2017/0069925 | A1* | 3/2017 | Barari .............. H01M 8/04753 |
| 2018/0358639 | A1 | 12/2018 | Yajima et al. |
| 2019/0148744 | A1 | 5/2019 | Choi et al. |
| 2021/0376361 | A1* | 12/2021 | Dionne .............. H01M 8/12 |
| 2022/0336831 | A1* | 10/2022 | Ikeguchi .......... H01M 8/04302 |

FOREIGN PATENT DOCUMENTS

| | | |
|---|---|---|
| EP | 2176910 A1 | 4/2010 |
| EP | 2767506 A1 | 8/2014 |
| EP | 1645540 B1 | 6/2017 |
| EP | 3392951 A1 | 10/2018 |
| EP | 3633778 A1 | 4/2020 |
| JP | 2004031025 A | 1/2004 |
| JP | 2005255896 A | 9/2005 |
| JP | 2006278074 A | 10/2006 |
| JP | 2006351293 A | 12/2006 |
| JP | 4885917 B2 | 6/2010 |
| JP | 6182450 B2 | 8/2017 |
| KR | 100718106 B1 | 5/2007 |
| KR | 20090079517 A | 7/2009 |
| KR | 101077929 B1 | 10/2011 |
| KR | 101172841 B1 | 8/2012 |
| KR | 101179539 B1 | 8/2012 |
| KR | 101276677 B1 | 6/2013 |
| WO | 2009057648 A1 | 5/2009 |
| WO | 2016114214 A1 | 7/2016 |
| WO | WO-2021059351 A1 * | 4/2021 .............. H01M 8/04 |

OTHER PUBLICATIONS

U.S. Office Action dated Mar. 24, 2022 pertaining to U.S. Appl. No. 16/907,731, filed Jun. 22, 2020, 39 pages.

Zhang, Dongke "Homogeneous Combustion Catalysts for Efficiency Improvements and Emission Reduction in Diesel Engines" In: 7th Asia-Pacific Conference on Combustion, National Taiwan University, Taipei, Taiwan May 24-27, 2009 (Year: 2009).

International Search Report and Written Opinion dated Feb. 22, 2021 pertaining to International application No. PCT/US2020/060096 filed Nov. 12, 2020, 15 pgs.

Araki S. et al. "Start-up procedures in autothermal reforming of biogas over a Ni based catalytic monolith", Catalysis Communications, Elsevier, Amsterdam, NL, vol. 10, No. 9, Apr. 25, 2009, pp. 1300-1304.

Springmann S. et al. "Cold start simulations of a gasoline based fuel processor for mobile fuel cell applications", Journal of Power Sources, Elsevier SA, CH, vol. 128, No. 1, Mar. 29, 2004, pp. 13-24.

International Search Report and Written Opinion dated Mar. 19, 2021 pertaining to International application No. PCT/US2020/064833 filed Dec. 14, 2020, 14 pgs.

Office Action dated May 27, 2021 pertaining to U.S. Appl. No. 16/830,649, filed Mar. 26, 2020, 22 pages.

U.S. Notice of Allowance and Fee(s) Due dated Sep. 20, 2021 pertaining to U.S. Appl. No. 16/830,649, filed Mar. 26, 2020, 9 pages.

Yoon, S. et al. "Development of a self-sustaining kWe-class integrated diesel fuel processing system for solid oxide fuel cells", International Journal of Hydrogen Energy, Elsevier Science Publishers B.V., Barking, GB, vol. 36, No. 16, Oct. 1, 2010, pp. 10302-10310.

International Search Report and Written Opinion dated Oct. 4, 2021 pertaining to International application No. PCT/US2021/038440 filed Jun. 22, 2021, 13 pages.

* cited by examiner

SOLID OXIDE FUEL CELL SYSTEMS AND METHODS OF OPERATING SOLID OXIDE FUEL CELL SYSTEMS

BACKGROUND

Field

The present disclosure relates to solid oxide fuel cells and, more specifically, to solid oxide fuel cell systems and methods of operating solid oxide fuel cell systems.

Technical Background

Fuel cells, such as solid oxide fuel cells, are electrochemical systems that convert the reaction energy of a fuel, such as hydrogen or a hydrocarbon-based material, and an oxidizing agent, such as oxygen, into electrical energy. Generally, fuel cells include an anode, a cathode, and an electrolyte. Solid oxide fuel cells, in particular, are characterized by an electrolyte that is a solid metal oxide or ceramic material. The relatively warmer operating temperatures of solid oxide fuel cells allow for a greater variety of fuel sources when compared to other fuel cell types, such as phosphoric acid or alkaline fuel cells. However, these relatively warmer temperatures may result in the thermal shock of one or more of the solid oxide fuel cells in the stack. Thermal shock may result in a reduction in the output of electrical energy by the solid oxide fuel cell system, the loss of fuel through physical defects formed in the solid oxide fuel cell stack, or the complete failure of the solid oxide fuel cell system.

SUMMARY

Accordingly, there is an ongoing need for solid oxide fuel cell systems and methods of operating solid oxide fuel cell systems that reduce or eliminate the risk of thermal shock. The systems and methods of the present disclosure meet this need by reducing or preventing the flow of anode gas through the solid oxide fuel cell stack until the flow of cathode gas has heated the solid oxide fuel cell stack to a sufficient operating temperature. In particular the systems and methods of the present disclosure utilize an anode gas regulator to regulate the volumetric flow rate of the anode gas through the solid oxide fuel such that the volumetric flow rate increases proportionally to the temperature of the solid oxide fuel cell stack. Without being bound by any particular theory, it is believed that the proportionality of these rates prevents the formation of the thermal gradients that may result in thermal shock.

According to one or more embodiments of the present disclosure, a method of operating a solid oxide fuel cell system may comprise contacting a cathode gas comprising oxygen with a heating element to produce a heated cathode gas, passing the heated cathode gas through a cathode of a solid oxide fuel cell stack to increase the temperature of the solid oxide fuel cell stack to an operation temperature and reduce the oxygen to oxygen anions, and passing an anode gas through an anode of the solid oxide fuel cell stack to initiate the electrochemical oxidation of the oxygen anions within the anode. The passing of the anode gas through the anode of the solid oxide fuel cell stack may be initiated when the solid oxide fuel cell stack is heated to an operational temperature. During the operation period of the solid oxide fuel cell stack, the flow rate and temperature of anode gas are maintained to prevent thermal shock at the anode of the solid fuel cell stack.

According to one or more additional embodiments of the present disclosure, a solid oxide fuel cell system may comprise a solid oxide fuel cell stack, a cathode gas source, an anode gas source, and an anode gas regulator. The solid oxide fuel cell stack may comprise an anode, a cathode, and a solid electrolyte. The cathode gas source may be operable to pass a cathode gas through the cathode of the solid oxide fuel cell stack. The anode gas source may comprise an autothermal reformer operable to produce an anode gas by the autothermal reforming of a hydrocarbon fuel, and to pass the anode gas through the anode of the solid oxide fuel cell stack. The anode gas regulator may be operable to regulate the flow of the anode gas through the anode of the solid oxide fuel cell stack by diverting at least a portion of the anode gas to bypass the solid oxide fuel cell stack.

Additional features and advantages of embodiments of the present disclosure will be set forth in the detailed description that follows, and in part will be readily apparent to a person of ordinary skill in the art from the description or recognized by practicing the technology as described in this disclosure, including the detailed description that follows and the claims.

BRIEF DESCRIPTION OF THE DRAWINGS

The following detailed description of embodiments of the present disclosure can be best understood when read in conjunction with the following drawing in which.

Figure 1:
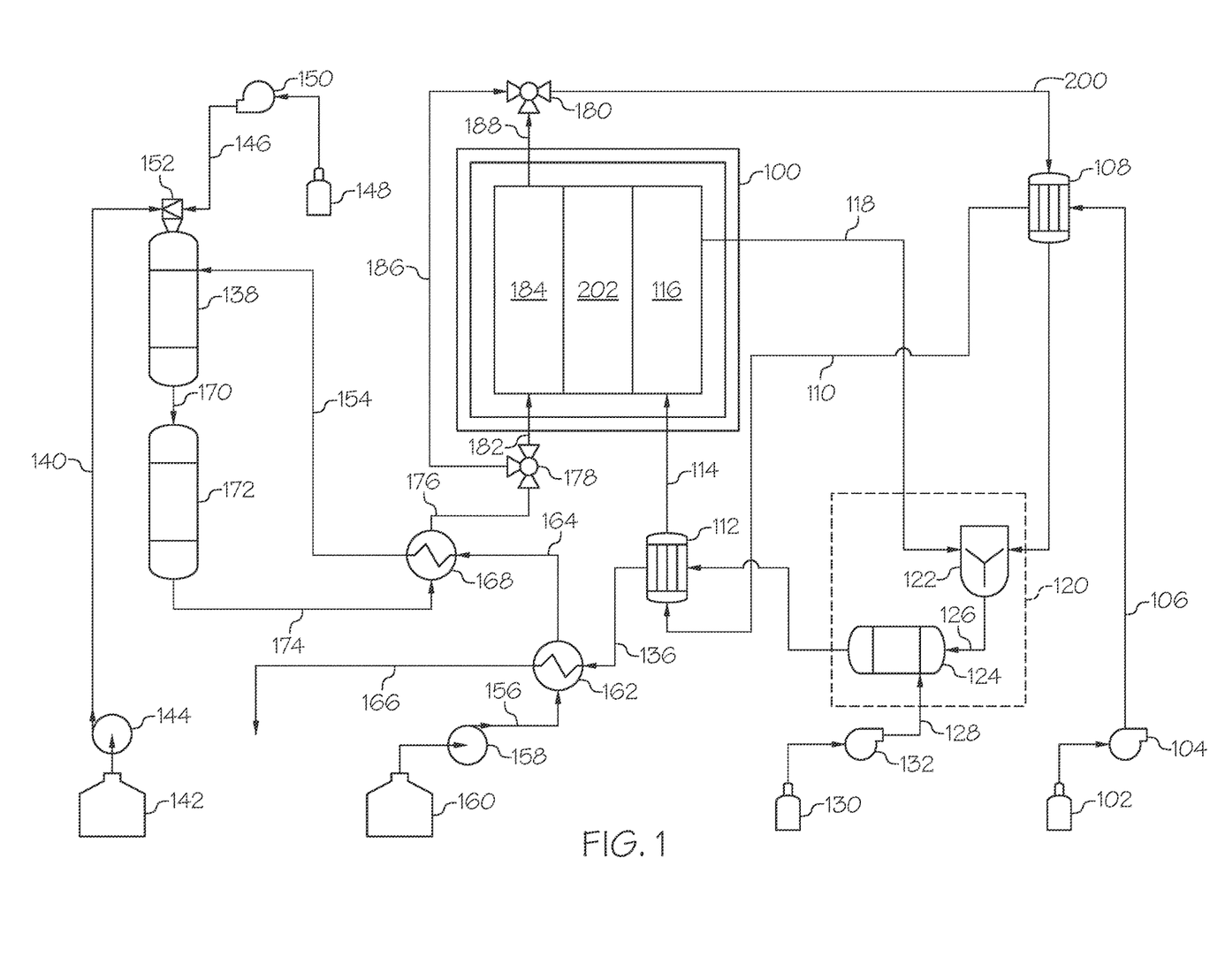
FIG. 1 schematically depicts a solid oxide fuel cell system, according to one or more embodiments of the present disclosure.

For the purpose of describing the simplified schematic depiction of FIG. 1, the numerous valves, temperature sensors, electronic controllers, and the like, that may be employed and well known to a person of ordinary skill in the art are not included. It should be understood that these components are within the spirit and scope of the present disclosure. However, operational components, such as those described in the present disclosure, may be added to the embodiments described in the present disclosure.

It is noted that arrows in the drawing refer to process streams. However, the arrows may equivalently refer to transfer lines, which may serve to transfer process streams between two or more system components. Additionally, arrows that connect to system components may define inlets or outlets in each given system component. The arrow direction corresponds generally with the major direction of movement of the materials of the stream contained within the physical transfer line signified by the arrow. Furthermore, arrows that do not connect two or more system components may signify an outlet stream that exits the depicted system or an inlet stream that enters the depicted system.

It is further noted that arrows in the drawing may schematically depict process steps of transporting a stream from one system component to another system component. For example, an arrow from one system component pointing to another system component may represent "passing" a process stream from one system component to another system component, which may include the contents of a process stream "exiting" or being "removed" from one system component and "introducing" the contents of that product stream to another system component.

Reference will now be made in greater detail to various embodiments, some embodiments of which are illustrated in the accompanying drawing.

DETAILED DESCRIPTION

As stated previously, the present disclosure is directed to solid oxide fuel cell (sometimes referred to as SOFC) systems and methods of operating solid oxide fuel cell systems. At a fundamental level, solid oxide fuel cells comprise an anode, a cathode, and a solid oxide or ceramic electrolyte. Generally, a fuel source, such as hydrogen or a hydrocarbon-based material, is passed through the anode, and an oxidizing agent, such as oxygen, is passed through the cathode. Hydrogen in the fuel source reacts with oxygen anions in the anode to produce water and electrons. Oxygen in the oxidizing agent reacts with the electrons in the cathode to produce the oxygen anions, which are conducted through the electrolyte to the anode. Solid oxide fuel cell systems may incorporate a series of these solid oxide fuel cells into a stack joined by interconnects in order to increase the potential power output. Solid oxide fuel cells generally operate at relatively warmer temperatures when compared to other fuel cell types and, as a result, are capable of utilizing a broader range of fuel sources.

However, as stated previously, these relatively warmer temperatures may result in the thermal shock of one or more of the solid oxide fuel cells in the stack. As used in the present disclosure, the term "thermal shock" refers to the formation of physical defects in the solid oxide fuel cell caused by differential expansion resulting from a thermal gradient. Without being bound by any particular theory, it is believed that a thermal gradient across the solid oxide fuel cell greater than or equal to 300 degrees Celsius (° C.) may result in differential expansion sufficient to cause thermal shock. For example, a thermal gradient across the solid oxide fuel cell greater than or equal to 325° C., greater than or equal to 350° C., greater than or equal to 375° C., greater than or equal to 400° C., greater than or equal to 425° C., greater than or equal to 450° C., greater than or equal to 475° C., or greater than or equal to 500° C. may result in differential expansion sufficient to cause thermal shock. However, the resistance of a solid oxide fuel cell to thermal shock may vary depending on the materials of the solid oxide fuel cell. For example, when a hot fuel source is passed through a solid oxide fuel cell before it is heated to an operational temperature, such as by an oxidizing agent, thermal shock may result in the cracking or fracturing of the electrolyte, and the failure of the solid oxide fuel cell.

Accordingly, the present disclosure are directed to solid oxide fuel cell systems and methods of operating solid oxide fuel cell systems that reduce or eliminate the risk of thermal shock. In particular, embodiments of the present disclosure are directed to a solid oxide fuel cell system comprising a solid oxide fuel cell stack, a cathode gas source, an anode gas source, and an anode gas regulator. The solid oxide fuel cell stack may comprise an anode, a cathode, and a solid electrolyte. The cathode gas source may be operable to pass a cathode gas through the cathode of the solid oxide fuel cell stack. The anode gas course may comprise an autothermal reformer operable to produce the anode gas by the autothermal reforming of a hydrocarbon fuel. The anode gas regulator may be operable to regulate the flow of the anode gas through the anode of the solid oxide fuel cell stack by diverting at least a portion of the anode gas to bypass the solid oxide fuel cell stack. Embodiments of the present disclosure are also directed to a method of operating a solid oxide fuel cell system comprising contacting a cathode gas with a heating element to produce a heated cathode gas, passing the heated cathode gas through a cathode of a solid oxide fuel cell stack to increase the temperature of the solid oxide fuel cell stack at a first rate, passing an anode gas through an anode of the solid oxide fuel cell stack to initiate an oxidation reaction within the solid oxide fuel cell stack, and increasing the volumetric flow rate of the anode gas through the anode at a second rate that is proportional to the first rate.

The solid oxide fuel cell system of the present disclosure may generally comprise a solid oxide fuel cell stack, an anode gas source, and a cathode gas source. As noted previously, solid oxide fuel cells generally comprise an anode, a cathode, and a solid electrolyte. Additionally, solid oxide fuel cell stacks may comprise a series of solid oxide fuel cells joined by interconnects. For the sake of simplicity, the solid oxide fuel cell stack 100 depicted in FIG. 1 is depicted as a single solid oxide fuel cell with a single anode, a single cathode, and a single solid electrolyte. However, it should be appreciated that the number of individual solid oxide fuel cells in the solid oxide fuel cell stack 100 may vary significantly depending on the desired output of the solid oxide fuel cell system. Accordingly, while the solid oxide fuel cell stack may comprise as few as one solid oxide fuel cell, the depiction of FIG. 1 should not be interpreted to limit the number of solid oxide fuel cells in the solid oxide fuel cell stack 100. In general operation, the anode gas supply and the cathode gas supply of the solid oxide fuel cell system may pass anode gas and cathode gas, respectively, through the anodes and cathodes of the solid oxide fuel cell stack, which initiates an oxidation reaction within the solid oxide fuel cell stack.

The cathode gas source may be generally operable to pass a cathode gas through the one or more cathodes of the solid oxide fuel cell stack. In particular, the cathode gas source may be operable to gradually produce a heated cathode gas sufficient to gradually heat the solid oxide fuel cell stack to an operational temperature. Referring now to FIG. 1, the cathode gas source may comprise a cathode gas supply 102. A cathode gas blower 104 may pass a cathode gas 106 from the cathode gas supply 102 to a heat exchanger 108, which converts the cathode gas 106 into an intermediate cathode gas 110 via heat exchange with a high-temperature gas produced by the solid oxide fuel cell system.

The cathode gas 106 may generally comprise an oxidizing agent sufficient for operating of the solid oxide fuel cell system, such as oxygen. In embodiments, the cathode gas 106 may be substantially free of carbon monoxide, hydrogen disulfide, or combinations of these. As used in the present disclosure, the term "substantially free" of a compound refers to a particular element, such as the cathode gas 106, that comprises less than 1 mole percent (mol. %) of the compound. For example, the cathode gas 106, which may be substantially free of carbon dioxide, may comprise less than 1 mol. %, less than 0.9 mol. %, less than 0.8 mol. %, less than 0.7 mol. %, less than 0.6 mol. %, less than 0.5 mol. %, less than 0.4 mol. %, less than 0.3 mol. %, less than 0.2 mol. %, or less than 0.1 mol. % of carbon monoxide, based on the total amount of moles of the cathode gas 106. Without being bound by any particular theory, it is believed that even minute concentrations of carbon dioxide in the cathode gas 106 may poison the solid oxide fuel cell 100 and, as a result, reduce the power output or prevent the operation of the solid oxide fuel cell 100. The flow rate of the cathode gas 106 may be generally determined based on the electrical capacity of the solid oxide fuel cell 100. However, in embodiments, the flow rate of cathode gas 106 should be sufficient to provide at least two times the stoichiometric amount of oxygen required for the operation of the solid oxide fuel cell 100 at a given electrical capacity.

The heat exchanger 108 may comprise a shell and tube heat exchanger. The properties of the heat exchanger 108, such as heat capacity and heat transfer coefficient, may be determined according to the operating conditions of the solid oxide fuel cell system. Prior to being passed to the heat exchanger 108, the cathode gas 106 may have an average temperature of from 20 degrees Celsius (° C.) to 50° C. For example, prior to being passed to the heat exchanger 108, the cathode gas 106 may have an average temperature of from 20° C. to 45° C., from 20° C. to 40° C., from 20° C. to 35° C., from 20° C. to 30° C., from 20° C. to 25° C., from 25° C. to 50° C., from 25° C. to 45° C., from 25° C. to 40° C., from 25° C. to 35° C., from 25° C. to 30° C., from 30° C. to 50° C., from 30° C. to 45° C., from 30° C. to 40° C., from 30° C. to 35° C., from 35° C. to 50° C., from 35° C. to 45° C., from 35° C. to 40° C., from 40° C. to 50° C., from 40° C. to 45° C., or from 45° C. to 50° C. The intermediate cathode gas 110 may have an average temperature of from 300° C. to 500° C. For example, the intermediate cathode gas 110 may have an average temperature of from 300° C. to 450° C., from 300° C. to 400° C., from 300° C. to 350° C., from 350° C. to 500° C., from 350° C. to 450° C., from 350° C. to 400° C., from 400° C. to 500° C., from 400° C. to 450° C., or from 450° C. to 500° C.

The intermediate cathode gas 110 may then be passed to a heat exchanger 112, which converts the intermediate cathode gas 110 into a heated cathode gas 114 via heat exchange with a high-temperature gas produced by the solid oxide fuel cell system. The heat exchanger 112 may comprise a shell and tube heat exchanger. The properties of the heat exchanger 112, such as heat capacity and heat transfer coefficient, may be determined according to the operating conditions of the solid oxide fuel cell system. As described previously, prior to being passed to the heat exchanger 112, the intermediate cathode gas 110 may have an average temperature of from 300° C. to 500° C. The heated cathode gas 114 may have an average temperature of from 600° C. to 800° C. For example, the heated cathode gas 114 may have an average temperature of from 600° C. to 750° C., from 600° C. to 700° C., from 600° C. to 650° C., from 650° C. to 800° C., from 650° C. to 750° C., from 650° C. to 700° C., from 700° C. to 800° C., from 700° C. to 750° C., or from 750° C. to 800° C. The heated cathode gas 114 may then be passed through a cathode 116 of the solid oxide fuel cell stack 100.

Referring still to FIG. 1, unreacted cathode gas 118 may be passed from the cathode 116 to a heater 120. The heater 120 may be generally operable to utilize unreacted anode gas and cathode gas from the solid oxide fuel cell system to generate heat, which may in turn be used to heat one or more components of the solid oxide fuel cell system to a desired operating temperature. The heater 120 may comprise a mixer 122 and a catalytic combustor 124. The unreacted cathode gas 118 may be passed to the heater 120 through the mixer 122, which mixes the unreacted cathode gas 118 with anode gas discharged from the heat exchanger 108 to produce a combustion fuel 126. The combustion fuel 126 may then be passed to the catalytic combustor 124, which mixes the combustion fuel 126 with a supplemental gas 128 that is passed to the catalytic combustor 124 from a supplemental gas supply 130 by a supplemental gas blower 132. The supplemental gas 128 may comprise air. After mixing the combustion fuel 126 with the supplemental gas 128, the catalytic combustor 124 catalytically combusts hydrogen and carbon monoxide in the combustion fuel 126 to produce a heated gas 134. The heated gas 134 may then be passed to the heat exchanger 112, as described previously, which converts the heated gas 134 into an intermediate heated gas 136 via heat exchange with the cathode gas 110.

Various structural embodiments are contemplated for the catalytic combustor 124. In embodiments, the catalytic combustor 124 may comprise a diesel combustor comprising a diesel combustion catalyst. Various diesel combustion catalysts may be considered suitable and familiar to a person of ordinary skill in the art. For example, metallic or organometallic catalysts comprising one or more of iron, ceria, or platinum, may be suitable for use in the catalytic combustor 124. The temperature range of the combustion fuel 126 as well as the concentration of hydrogen and carbon monoxide in the combustion fuel 126 may vary greatly between start-up and operational conditions of the solid oxide fuel cell system. Accordingly, the combustion catalyst may be selected such that the range of operating conditions of the combustion catalyst corresponds to the potential variance of the combustion fuel 126.

Once the solid oxide fuel cell system reaches operational conditions, the catalytic combustor 124 generally operates at a temperature of from 650° C. to 850° C. For example, the catalytic combustor 124 may operate at a temperature of from 650° C. to 825° C., from 650° C. to 800° C., from 650° C. to 775° C., from 650° C. to 750° C., from 650° C. to 725° C., from 650° C. to 700° C., from 650° C. to 675° C., from 675° C. to 850° C., from 675° C. to 825° C., from 675° C. to 800° C., from 675° C. to 775° C., from 675° C. to 750° C., from 675° C. to 725° C., from 675° C. to 700° C., from 700° C. to 850° C., from 700° C. to 825° C., from 700° C. to 800° C., from 700° C. to 775° C., from 700° C. to 750° C., from 700° C. to 725° C., from 725° C. to 850° C., from 725° C. to 825° C., from 725° C. to 800° C., from 725° C. to 775° C., from 725° C. to 750° C., from 750° C. to 850° C., from 750° C. to 825° C., from 750° C. to 800° C., from 750° C. to 775° C., from 775° C. to 850° C., from 775° C. to 825° C., from 775° C. to 800° C., from 800° C. to 850° C., from 800° C. to 825° C., or from 825° C. to 850° C. When the temperature of the catalytic combustor 124 exceeds this range, the diesel combustion catalyst may become damaged or deactivated and the catalytic combustor 124 may cease operation. The flow rate of the supplemental gas 128 to the catalytic combustor 124 may be adjusted during operation to maintain the temperature of the catalytic combustor 124.

The anode gas source may be generally operable to pass an anode gas through the one or more anodes of the solid oxide fuel cell stack. In particular, the anode gas source may be operable to produce an anode gas via the catalytic reforming of a hydrocarbon fuel source, such as diesel fuel. Referring still to FIG. 1, the anode gas source may comprise an autothermal reformer 138. A reformer fuel 140 may be pumped from a fuel tank 142 using a fuel pump 144 and passed to the autothermal reformer 138. The reformer fuel 140 may generally comprise any hydrocarbon fuel source. For example, the reformer fuel 140 may comprise liquid fuels, such as diesel fuel, gasoline, heavy naphtha, jet propellant 8 (also referred to as JP-8), or combinations of these, or gaseous fuels, such as methane, natural gas, butane, propane, or combinations of these. A reformer gas 146 may be passed to the autothermal reformer 138 from a reformer gas supply 148 by an air blower 150. The reformer gas 146 may comprise air. The reformer fuel 140 and the reformer gas 146 may be passed to the autothermal reformer 138 through an atomizer 152, which mixes and atomizes the reformer fuel 140 and the reformer gas 146.

Additionally, a reformer steam 154 may be produced from a water source 156 and passed to the autothermal reformer 138. A water pump 158 may pass the water source 156 from a water tank 160 to a heat exchanger 162, which converts the water source 156 into an intermediate steam 164 via heat exchange with the intermediate heated gas 136 discharged from the heat exchanger 162. The heat exchanger 162 may comprise a shell and tube heat exchanger. The properties of the heat exchanger 162, such as heat capacity and heat transfer coefficient, may be determined according to the operating conditions of the solid oxide fuel cell system. The intermediate heated gas 136 discharged from the heat exchanger 162 may be expelled from the solid oxide fuel cell system as a vent gas 166. The intermediate steam 164 may then be passed to a heat exchanger 168, which produces the reformer steam 154 via heat exchange with the final product of the anode gas source. The heat exchanger 168 may comprise a shell and tube heat exchanger. The properties of the heat exchanger 168, such as heat capacity and heat transfer coefficient, may be determined according to the operating conditions of the solid oxide fuel cell system.

In operation, the autothermal reformer 138 may promote the autothermal reforming of the reformer fuel 140 to produce a reformate 170. In particular, the autothermal reformer 138 may promote both the partial oxidation (PDX) and steam reforming (SR) of hydrocarbons in the reformer fuel 140 to produce a reformate 170 that comprises syngas (that is, hydrogen ($H_2$) and carbon monoxide (CO)). In operation, the autothermal reformer 138 utilizes high-pressure and high-temperature operating conditions. In embodiments, the autothermal reformer 138 may have an operating temperature of at least 700° C. For example, the autothermal reformer 138 may have an operating temperature of from 750° C. to 1100° C., from 750° C. to 1050° C., from 750° C. to 1000° C., from 750° C. to 950° C., from 750° C. to 900° C., from 750° C. to 850° C., from 750° C. to 800° C., from 800° C. to 1100° C., from 800° C. to 1050° C., from 800° C. to 1000° C., from 800° C. to 950° C., from 800° C. to 900° C., from 800° C. to 850° C., from 850° C. to 1100° C., from 850° C. to 1050° C., from 850° C. to 1000° C., from 850° C. to 950° C., from 850° C. to 900° C., from 900° C. to 1100° C., from 900° C. to 1050° C., from 900° C. to 1000° C., from 900° C. to 950° C., from 950° C. to 1100° C., from 950° C. to 1050° C., from 950° C. to 1000° C., from 1000° C. to 1100° C., from 1000° C. to 1050° C., or from 1050° C. to 1100° C. Moreover, the autothermal reformer 138 may have an operating pressure of at least 1 bar. For example, the autothermal reformer 138 may have an operating pressure of from 1 bar to 5 bar, from 1 bar to 4.5 bar, from 1 bar to 4 bar, from 1 bar to 3.5 bar, from 1 bar to 3 bar, from 1 bar to 2.5 bar, from 1 bar to 2 bar, from 1 bar to 1.5 bar, from 1.5 bar to 5 bar, from 1.5 bar to 4.5 bar, from 1.5 bar to 4 bar, from 1.5 bar to 3.5 bar, from 1.5 bar to 3 bar, from 1.5 bar to 2.5 bar, from 1.5 bar to 2 bar, from 2 bar to 5 bar, from 2 bar to 4.5 bar, from 2 bar to 4 bar, from 2 bar to 3.5 bar, from 2 bar to 3 bar, from 2 bar to 2.5 bar, from 2.5 bar to 5 bar, from 2.5 bar to 4.5 bar, from 2.5 bar to 4 bar, from 2.5 bar to 3.5 bar, from 2.5 bar to 3 bar, from 3 bar to 5 bar, from 3 bar to 4.5 bar, from 3 bar to 4 bar, from 3 bar to 3.5 bar, from 3.5 bar to 5 bar, from 3.5 bar to 4.5 bar, from 3.5 bar to 4 bar, from 4 bar to 5 bar, from 4 bar to 4.5 bar, or from 4.5 bar to 5 bar.

Various structural embodiments are contemplated for the autothermal reformer 138. The internal and external partition walls of the autothermal reformer 138 may be formed of any material having suitable durability at a high temperature, such as 800° C., and a suitable heat transfer efficiency. For example, the internal and external partition walls may be substantially formed of stainless steel. Moreover, in order to promote the autothermal reforming of the reformer fuel 140, the autothermal reformer 138 may comprise a metal catalyst. Suitable metal catalysts may comprise nickel, platinum, ruthenium, rhodium, or combinations of these. The metal catalyst may be supported or unsupported. In embodiments, the autothermal reformer 138 may comprise a porous support (including a support having through-pores along a fluid conveying direction) through which the fluid is passed and which impregnates the metal catalyst. The porous support may comprise alumina ($Al_2O_3$), silica ($SiO_2$), ceria ($CeO_2$), or combinations of these. For example, the autothermal reformer 138 may comprise a nickel coated cordierite monolith.

Referring still to FIG. 1, the reformate 170 may be passed from the autothermal reformer 138 to a post-reformer 172. In operation, the post-reformer 172 may promote the selective decomposition of $C_2$-$C_5$ hydrocarbons in the reformate 170 to produce a post-reformate 174. In particular, a post-reformer catalyst may promote a reaction of the $C_2$-$C_5$ hydrocarbons with hydrogen and vapor in the reformate 170 to selectively decompose the $C_2$-$C_5$ hydrocarbons into hydrogen and methane ($CH_4$). In order to promote the decomposition of the reformate 170, the post-reformer 172 may comprise a noble metal catalyst, such as platinum (Pt), rhodium (Rh), palladium (Pd), rhenium (Re), or combinations thereof. The noble metal catalyst may be supported or unsupported. In embodiments, the post-reformer 172 may comprise a porous support (including a support having through-pores along a fluid conveying direction) through which the fluid is passed and which impregnates the noble metal catalyst. The catalyst support may comprise alumina, silica, ceria, or combinations of these. For example, the post-reformer 172 may comprise a platinum coated cordierite monolith. In operation, the post-reformer 172 utilizes operating conditions that are less severe than the autothermal reformer 138. In embodiments, the post-reformer 172 may have an operating temperature of at least 450° C. For example, the post-reformer 172 may have an operating temperature of from 450° C. to 800° C., from 450° C. to 750° C., from 450° C. to 700° C., from 450° C. to 650° C., from 450° C. to 600° C., from 450° C. to 550° C., from 450° C. to 500° C., from 500° C. to 800° C., from 500° C. to 750° C., from 500° C. to 700° C., from 500° C. to 650° C., from 500° C. to 600° C., from 500° C. to 550° C., from 550° C. to 800° C., from 550° C. to 750° C., from 550° C. to 700° C., from 550° C. to 650° C., from 550° C. to 600° C., from 600° C. to 800° C., from 600° C. to 750° C., from 600° C. to 700° C., from 600° C. to 650° C., from 650° C. to 800° C., from 650° C. to 750° C., from 650° C. to 700° C., from 700° C. to 800° C., from 700° C. to 750° C., or from 750° C. to 800° C. Moreover, the post-reformer 172 may have an operating pressure of at least 1 bar. For example, the post-reformer 172 may have an operating pressure of from 1 bar to 5 bar, from 1 bar to 4.5 bar, from 1 bar to 4 bar, from 1 bar to 3.5 bar, from 1 bar to 3 bar, from 1 bar to 2.5 bar, from 1 bar to 2 bar, from 1 bar to 1.5 bar, from 1.5 bar to 5 bar, from 1.5 bar to 4.5 bar, from 1.5 bar to 4 bar, from 1.5 bar to 3.5 bar, from 1.5 bar to 3 bar, from 1.5 bar to 2.5 bar, from 1.5 bar to 2 bar, from 2 bar to 5 bar, from 2 bar to 4.5 bar, from 2 bar to 4 bar, from 2 bar to 3.5 bar, from 2 bar to 3 bar, from 2 bar to 2.5 bar, from 2.5 bar to 5 bar, from 2.5 bar to 4.5 bar, from 2.5 bar to 4 bar, from 2.5 bar to 3.5 bar, from 2.5 bar to 3 bar, from 3 bar to 5 bar, from 3 bar to 4.5 bar, from 3 bar to 4 bar, from 3 bar to 3.5 bar, from 3.5 bar to 5 bar, from 3.5 bar to 4.5 bar, from 3.5 bar to 4 bar, from 4 bar to 5 bar, from 4 bar to 4.5 bar, or from 4.5 bar to 5 bar.

In embodiments, a hydrodesulfurizer may be disposed downstream of the post-reformer. The hydrodesulfurizer may remove sulfur from the post-reformate 174. In embodiments, the solid oxide fuel cell stack may be tolerant for operation with low-sulfur diesel having lesser or equal to 10 parts per million weight (ppmw) of sulfur, 9 ppmw of sulfur, or 8 ppmw of sulfur. The hydrodesulfurizer may include a desulfurizing catalyst. The desulfurizing catalyst may comprise a ZnO catalyst. In operation, the hydrodesulfurizer may utilize operating conditions that are less severe than both the autothermal reformer 138 and the post-reformer 172. In embodiments, the hydrodesulfurizer may have an operating temperature of greater than or equal to 300° C., 310° C., or 320° C. In embodiments, the hydrodesulfurizer may have an operating temperature of lesser than or equal to 450° C., 440° C., or 430° C. In embodiments, the hydrodesulfurizer may have an operating temperature of from 300° C. to 450° C., from 310° C. to 450° C., from 320° C. to 450° C., from 300° C. to 440° C., from 310° C. to 440° C., from 320° C. to 430° C., from 300° C. to 430° C., from 310° C. to 430° C., or from 320° C. to 430° C. In embodiments, the post-reformate 174 may bypass the hydrodesulfurizer and be passed to the heat-exchanger 168.

The post-reformate 174 may be passed from the post-reformer 172 to the heat exchanger 168, as described previously, which converts the post-reformate 174 into an anode gas 176 via heat exchange with the intermediate steam 164. Prior to being passed to the heat exchanger 168, the post-reformate 174 may have an average temperature of from 750° C. to 900° C. For example, prior to being passed to the heat exchanger 168, the post-reformate 174 may have an average temperature of from 750° C. to 875° C., from 750° C. to 850° C., from 750° C. to 825° C., from 750° C. to 800° C., from 750° C. to 775° C., from 775° C. to 900° C., from 775° C. to 875° C., from 775° C. to 850° C., from 775° C. to 825° C., from 775° C. to 800° C., from 800° C. to 900° C., from 800° C. to 875° C., from 800° C. to 850° C., from 80° C. to 825° C., from 825° C. to 900° C., from 825° C. to 875° C., from 825° C. to 850° C., from 850° C. to 900° C., from 850° C. to 875° C., or from 875° C. to 900° C. The anode gas 176 may have an average temperature of from 600° C. to 800° C. For example, the anode gas 176 may have an average temperature of from 600° C. to 750° C., from 600° C. to 700° C., from 600° C. to 650° C., from 650° C. to 800° C., from 650° C. to 750° C., from 650° C. to 700° C., from 700° C. to 800° C., from 700° C. to 750° C., or from 750° C. to 800° C. As described previously in the present disclosure, in order to reduce the risk of thermal shock, the temperature gradient across the solid oxide fuel cell stack must be minimized or eliminated. This may be accomplished, at least in part, when the average temperature of the anode gas 176 is the same as or similar to the average temperature of the heated cathode gas 114. Accordingly, the difference between the average temperature of the anode gas 176 and the heated cathode gas 114 may be from 0° C. to 50° C. For example, the difference between the average temperature of the anode gas 176 and the heated cathode gas 114 may be from 0° C. to 40° C., from 0° C. to 30° C., from 0° C. to 20° C., from 0° C. to 10° C., from 10° C. to 50° C., from 10° C. to 40° C., from 10° C. to 30° C., from 10° C. to 20° C., from 20° C. to 50° C., from 20° C. to 40° C., from 20° C. to 30° C., from 30° C. to 50° C., from 30° C. to 40° C., or from 40° C. to 50° C. Without being bound by any particular theory, it is believed that when the difference between the average temperature of the anode gas 176 and the heated cathode gas 114 is within this range, a thermal gradient may not form across the solid oxide fuel cell stack 100 during operation. As a result, the risk of thermal shock of the solid oxide fuel cell stack 100 may be reduced or eliminated.

The anode gas 176 may be passed to an anode gas regulator. The anode gas regulator may be generally operable to regulate the flow of anode gas into the solid oxide fuel cell stack in order to reduce or prevent the risk of thermal shock. In particular, the anode gas regulator may be operable to regulate the flow of anode gas into the solid oxide fuel cell stack such that anode gas is not passed through the solid oxide fuel cell stack until the solid oxide fuel cell stack reaches a desired temperature. Referring still to FIG. 1, the anode gas regulator may comprise an inlet valve 178 disposed on an inlet side of the solid oxide fuel cell stack 100 and an outlet valve 180 disposed on an outlet side of the solid oxide fuel cell stack 100. The inlet valve 178 and the outlet valve 180 may each comprise a three-way valve. The anode gas 176 may be passed from the heat exchanger 168 to the inlet valve 178, which splits the anode gas 176 into an anode supply stream 182 that is passed through an anode 184 of the solid oxide fuel cell stack 100, and a bypass stream 186 that bypasses the solid oxide fuel cell stack 100 and is passed to the outlet valve 180.

In operation, the inlet valve 178 may regulate the amount of anode gas supplied to the solid oxide fuel cell stack 100. In particular, the inlet valve 178 may increase the amount of anode gas supplied to the solid oxide fuel cell stack 100 by increasing the volumetric flow rate of the anode supply stream 182 and decreasing the volumetric flow rate of the bypass stream 186. Alternatively, the inlet valve 178 may decrease the amount of anode gas supplied to the solid oxide fuel cell stack 100 by decreasing the volumetric flow rate of the anode supply stream 182 and increasing the volumetric flow rate of the bypass stream 186. For example, when the solid oxide fuel cell stack 100 is at a non-operational temperature, such as room temperature, the inlet valve may prevent the flow of any anode gas through the anode 184 of the solid oxide fuel cell stack 100, and divert all anode gas produced by the anode gas source to the bypass stream 186.

Referring still to FIG. 1, the bypass stream 186 may be passed from the inlet valve 178 to the outlet valve 180. Additionally, unreacted anode gas 188 may be passed from the anode 184 to the outlet valve 180. The outlet valve 180 may mix the bypass stream 186 and the unreacted anode gas 188 to produce an anode discharge 200 that is passed to the heat exchanger 108, as described previously, which utilizes the anode discharge 200 as a heat source to produce the intermediate cathode gas 110. The anode gas discharged from the heat exchanger 108 may then be passed to the heater 120, as described previously.

As noted previously, the present disclosure is also directed to methods of operating solid oxide fuel cell systems. Accordingly, methods of operating solid oxide fuel cell systems, such as those described in the present disclosure, may include contacting a cathode gas with a heating element such that a heated cathode gas is produced. The cathode gas may be in accordance with the cathode gas previously described with respect to the solid oxide fuel cell systems of the present disclosure. Similarly, the heating elements may be in accordance with one or more of the heat exchangers previously described with respect to the solid oxide fuel cell systems of the present disclosure.

The heated cathode gas may be passed through a cathode of a solid oxide fuel cell stack at a steady rate. The heated cathode gas may be passed through the cathode of the solid oxide fuel cell in accordance with the passing of a cathode gas through a cathode as previously described with respect to the solid oxide fuel cell systems of the present disclosure. As shown in FIG. 1, components of the solid oxide fuel cell system may rely on exhaust streams of other components for operation. For example, the heater 120 may rely on an unreacted cathode gas 118 in order to produce the heated gas 134 necessary to heat the intermediate cathode gas 110. Accordingly, the heated cathode gas 114 may not immediately reach operational temperatures, as described previously.

The passing of the cathode gas through the cathode may increase the temperature of the solid oxide fuel cell stack. The cathode gas may be passed through the cathode until the solid oxide fuel cell reaches a suitable operational temperature. Without being bound by any particular theory, it is believed that an operational temperature of at least 500° C. may be required to prevent thermal shock of the solid oxide fuel cell. For example, the operational temperature of the solid oxide fuel cell may be greater than or equal to 550° C., greater than or equal to 600° C., greater than or equal to 650° C., greater than or equal to 700° C., greater than or equal to 750° C., greater than or equal to 800° C., greater than or equal to 850° C., greater than or equal to 900° C. However, it should be noted that the operational temperature should be as close to the temperature of the anode gas passed through the anode as possible to ensure stable operation. For example, the difference between the operational temperature of the solid oxide fuel cell and the anode gas passed through the anode may be from 0° C. to 40° C., from 0° C. to 30° C., from 0° C. to 20° C., from 0° C. to 10° C., from 10° C. to 50° C., from 10° C. to 40° C., from 10° C. to 30° C., from 10° C. to 20° C., from 20° C. to 50° C., from 20° C. to 40° C., from 20° C. to 30° C., from 30° C. to 50° C., from 30° C. to 40° C., or from 40° C. to 50° C.

Once the solid oxide fuel cell stack has reached a base operational temperature, an anode gas may be passed through an anode of the solid oxide fuel cell stack. As described previously, an anode gas regulator may be used to divert the anode gas and bypass the solid oxide fuel cell stack until the base operational temperature is achieved. The anode gas may be in accordance with the anode gas previously described with respect to the solid oxide fuel cell systems of the present disclosure. Similarly, the anode gas may be passed through the anode of the solid oxide fuel cell in accordance with the passing of an anode gas through an anode as previously described with respect to the solid oxide fuel cell systems of the present disclosure. Once the passing of the anode gas through the anode is initiated, hydrogen in the anode gas may react with oxygen anions in the anode to produce water and electrons. Oxygen in the heated cathode gas may react with the electrons in the cathode to produce the oxygen anions, which are conducted through the electrolyte to the anode.

As described previously, it is believed that the diversion of anode gas during the initial heating of the solid oxide fuel cell stack may reduce or eliminate the risk of thermal shock in the solid oxide fuel cell stack. In particular, the anode gas is not passed through the anode of the solid oxide fuel cell stack until the heated cathode gas has had sufficient time to heat the solid oxide fuel cell stack to a temperature the same as or similar to the average temperature of the anode gas. This minimization of temperature differences may reduce or eliminate any potential temperature gradients within the solid oxide fuel cell stack. Accordingly, the potential for differential expansion of the solid oxide fuel cell stack is reduced or eliminated and physical deformations, such as cracks in the solid electrolyte, that may cause the failure of the solid oxide fuel cell system do not form.

EXAMPLES

Example 1—Autothermal Reformer Stability Test

An autothermal reformer stability test was conducted at lab scale prototype having the configuration and characteristics of the system 1 illustrated in FIG. 1. The lab scale prototype was operated for 500 minutes at the flow rate for 1 kW electric generation. Mass flow meters (Bronkhorst Inc.) and liquid flow meters (Sensirion Inc.) were used to monitor the flow rates. Mass flow controllers (Bronkhorst Inc.) and pumps (Flom Inc.) were used to provide the fuel and oxidants. In Example 1, a reformer fuel (Commercial diesel for South Korea (SK petroleum)) was introduced to the autothermal reformer with air and steam to convert the reformer fuel to a reformate. Initially air was supplied with flow rates of 20 L/min (10 L/min for nozzle, and 10 L/min for the autothermal reformer) with electrical heating coil to heat up the metal catalyst (platinum and ceria (cerium oxide) based catalyst) in the autothermal reformer (step 1). When the metal catalyst temperature reached to 230° C., air flow rate for the autothermal reformer was reduced to 6.51 L/min and the reformer fuel was supplied at 1.2 mL/min to start the diesel oxidation (step 2). When the temperature of the metal catalyst reached to 500° C., the electrical heating coil was off, since there was no need to provide external electrical energy (step 3). Reaction temperature was maintained by the reaction heat of diesel oxidation. When the temperature of the metal catalyst reached to 550° C., partial autothermal reforming reaction was started by changing the flow rates (Air flow for the autothermal reformer=8.8 L/min, fuel flow=4.22 mL/min, and water flow=5.37 mL/min) (step 4).

After the temperature stabilization, the autothermal reforming reaction was accelerated by changing the flow rates (Air flow for the autothermal reformer=14.8 L/min, fuel flow=5.56 mL/min, and water flow=10.64 mL/min) (step 5). Finally, the flow rates were modified to the steady condition (Air flow for the autothermal reformer=21.8 L/min, fuel flow=7.13 mL/min, and water flow=15.16 mL/min to produce 1 kW electrical energy at the solid oxide fuel cell stack) (step 6). All flow rates are controlled and measured at the inlets. Table 1 shows the operating conditions of steps 1-6.

TABLE 2

| Test | Hours | Condition |
| --- | --- | --- |
| $1^{st}$ test | 0-50.4 hours | Normal operation |
| $2^{nd}$ test | 50.4-51.2 hours | Nozzle (placed at the atomizer 152) clogging |
| $3^{rd}$ test | 51.2-55.4 hours | Fuel pump fluctuation |
| $4^{th}$ test | 55.4-66.7 hours | Pressurized operation at 0.3, 0.5, and 0.75 bar |

With the cycling tests, no damage was observed at the solid oxide fuel stack even with multiple start-up and

TABLE 1

| | Set Values | | | | Real Values | | | | |
| --- | --- | --- | --- | --- | --- | --- | --- | --- | --- |
| | GHSV | OCR | SCR | Coil | Air heater temperature (° C.) | Air (L/min) | Diesel (ml/min) | Water (ml/min) | Air (Nozzle) (L/min) | Air (Cathode) (L/min) |
| Step 1 | — | — | — | On | 500 | 10 | 0 | 0 | 10 | 100 |
| Step 2 | 5000 | 2.0 | — | On | 500 | 6.51 | 1.2 | 0 | 10 | 100 |
| Step 3 | — | — | — | Off | 500 | 6.51 | 1.2 | 0 | 10 | 100 |
| Step 4 | 8000 | 0.65 | 1.2 | Off | 600 | 8.8 | 4.22 | 5.37 | 10 | 100 |
| Step 5 | 12000 | 0.65 | 1.8 | Off | 600 | 14.8 | 5.56 | 10.64 | 10 | 100 |
| Step 6 | 16000 | 0.65 | 2.0 | Off | 600 | 21.8 | 7.13 | 15.16 | 10 | 100 |

Figure 2A:
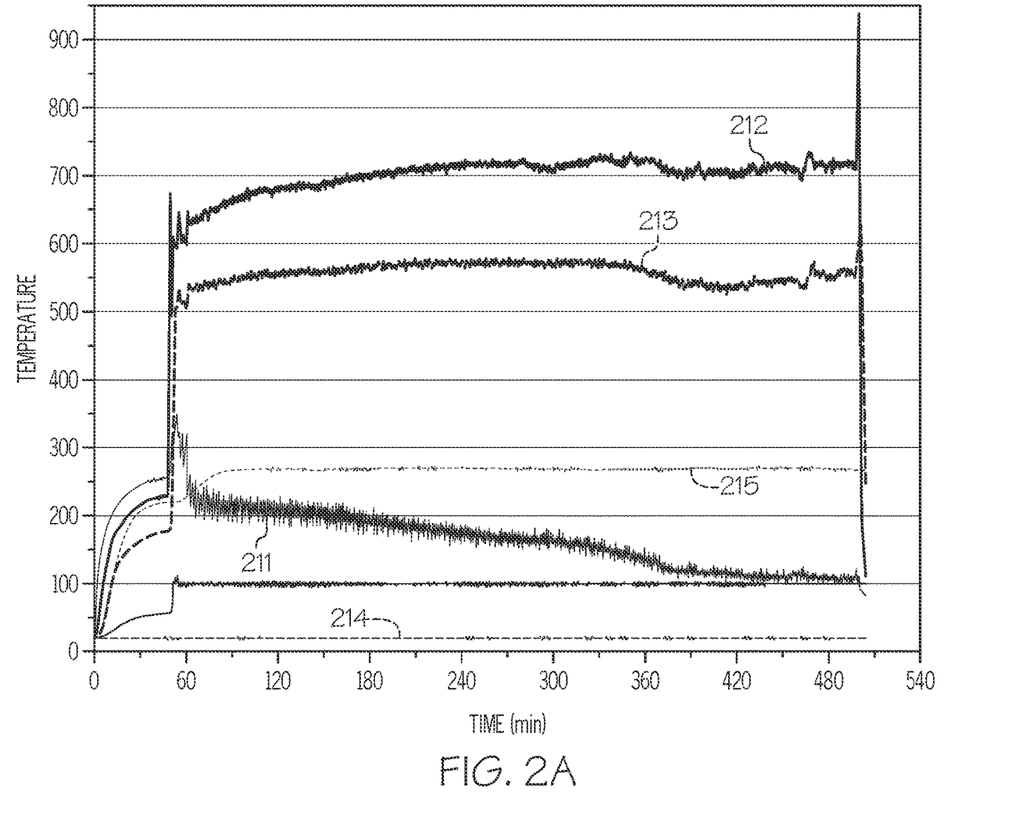
FIG. 2A graphically depicts a differential temperature (y-axis) of an inlet of autothermal reformer, an outlet of autothermal reformer, an inlet of post-reformer, an outlet of post-reformer, steam for the autothermal reformer, and air for a cathode, as a function of the logarithm of time (x-axis) during the operation period, according to Example 1.

*GHSV = Gas Hourly Space Velocity
*OCR = Oxygen to Carbon Ratio
*SCR = Steam to Carbon Ratio During the operation period, a differential temperature of an inlet of autothermal reformer 211, an outlet of autothermal reformer 212, an inlet of post-reformer 213, steam for the autothermal reformer 214, and air for a cathode 215 were measured and depicted in FIG. 2A. As shown in FIG. 2A, the temperature of an inlet of autothermal reformer 211, an outlet of autothermal reformer 212, an inlet of post-reformer 213, steam for the autothermal reformer 214, and air for a cathode 215 were generally maintained during the operation period. During the operation period, thermal shock at the fuel cell anode was prevented, which is proved by maintaining the temperature of an inlet of autothermal reformer 211, an outlet of autothermal reformer 212, an inlet of post-reformer 213. Further, the thermal shock gradient was less when the temperature of the steam for the autothermal reformer 214 and air for the cathode 215 were maintained.

Figure 2B:
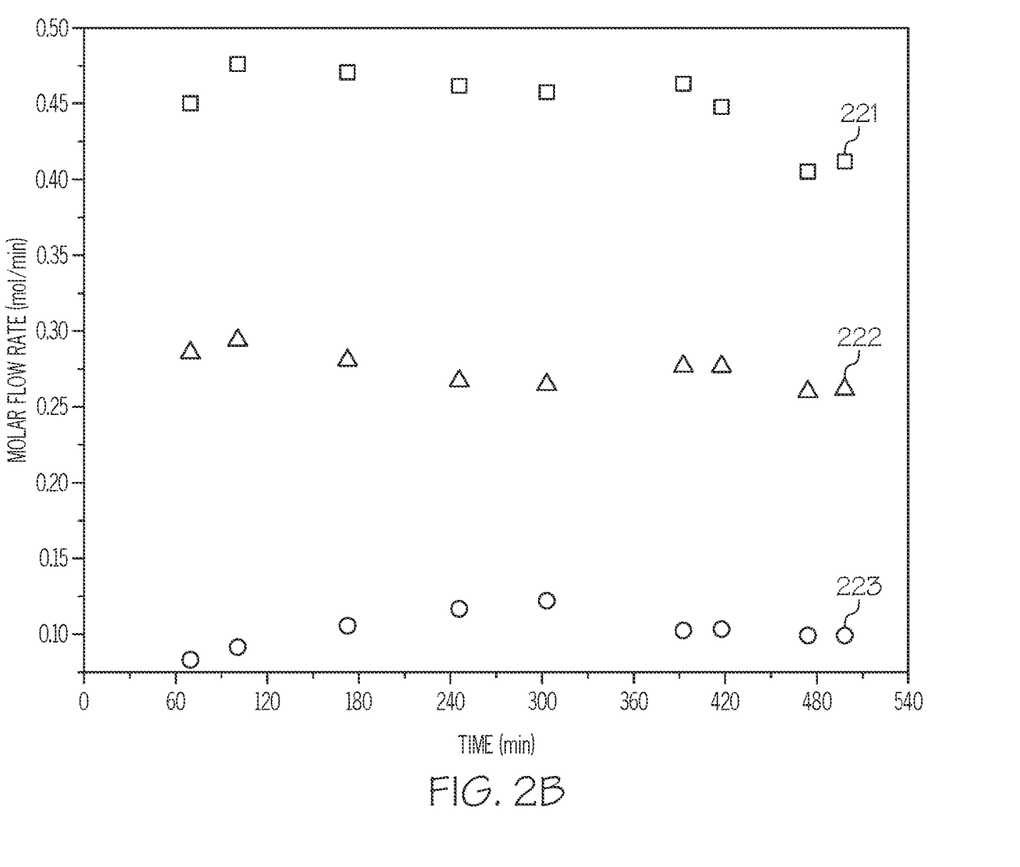
FIG. 2B graphically depicts a differential molar flow rate (y-axis) of $H_2$, $CO_2$, and CO in an outlet stream of post-reformer as a function of the logarithm of time (x-axis) during the operation period, according to Example 1.
Figure 2C:
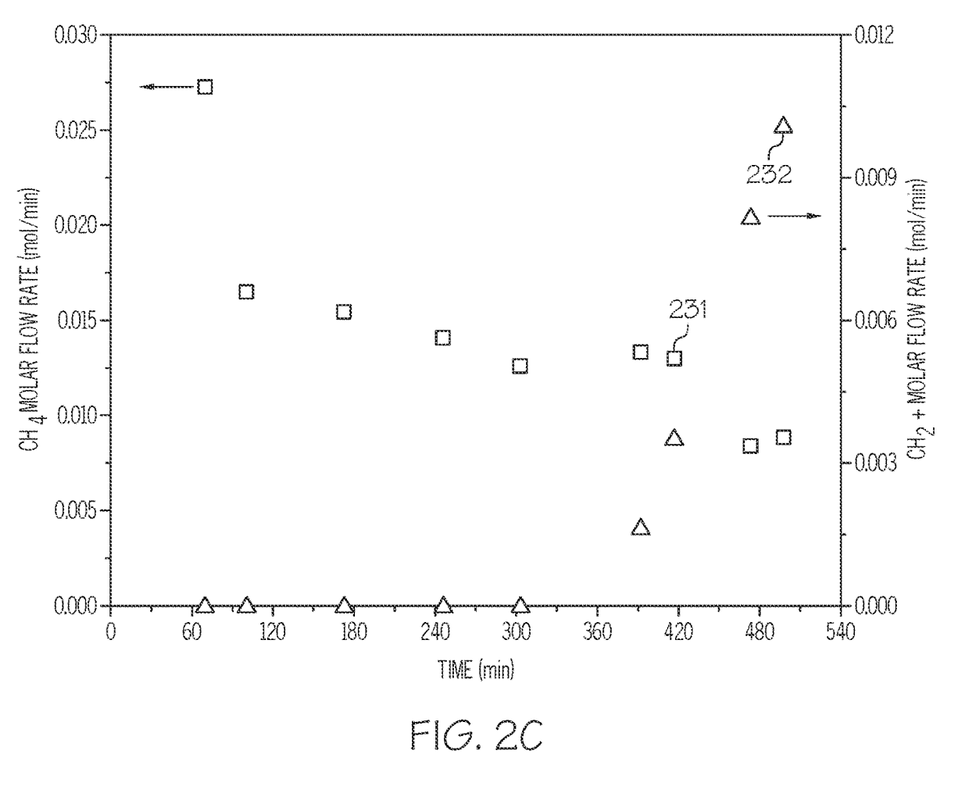
FIG. 2C graphically depicts a differential molar flow rate (y-axis) of $CH_4$, and $C_{2+}$ in an outlet stream of post-reformer as a function of the logarithm of time (x-axis) during the operation period, according to Example 1.

During the operation period, a differential molar flow rate of $H_2$ 221, $CO_2$ 222, and CO 223 in the outlet stream of post-reformer were measured and depicted in FIG. 2B and a differential molar flow rate of $CH_4$ 231, $C_{2+}$ 232 in the outlet stream of post-reformer were measured and depicted in FIG. 2C. FIGS. 2B and 2C show the stable operation of the autothermal reformer at the initial period (0 to 360 min). Products, such as $H_2$ 221, $CO_2$ 222, CO 223, and $CH_4$ 231, showed stable flow rates at the steady state (90 to 360 min) of the autothermal reformer. Increase of the $C_{2+}$ flow 232 rates at FIG. 2C shows the instability of the autothermal reformer due to the catalyst deactivation, but as shown in Example 2 below, the stability was enhanced even with thermal cycling.

Example 2—Cycling Tests

A total of 4 cycling tests for the stability test in Example 1 were conducted in 66.7 hours. The test hours and operating conditions were shown in Table 2. Between the tests, the autothermal reformer, and post-reformer were shut down (cooled down) and restarted.

shut-down tests. The autothermal reformer was operated well although there were a nozzle replacement at the inlet of the autothermal reformer between $1^{st}$ and $2^{nd}$ tests, and the fuel pump fluctuation during $3^{rd}$ test.

Figure 3A:
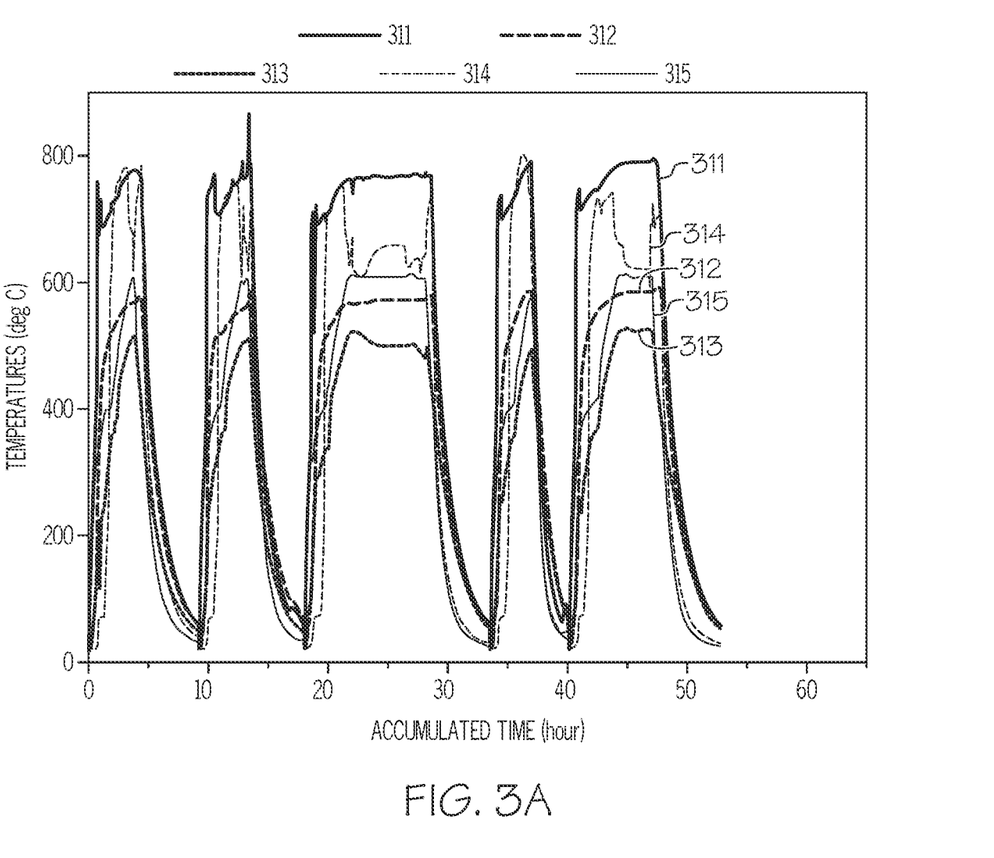
FIG. 3A graphically depicts a differential temperature (y-axis) of an outlet of autothermal reformer, an outlet of post reformer, steam for the autothermal reformer, a catalytic combustor, and an outlet of cathode, as a function of the logarithm of time (x-axis) during the cycling tests, according to Example 2.

During the cycling tests, a differential temperature of an outlet of autothermal reformer 311, an outlet of post reformer 312, steam for the autothermal reformer 313, a catalytic combustor 314, and an outlet of cathode 315 were measured and depicted in FIG. 3A. As shown in FIG. 3A, during each of 4 cycling tests, the temperature of an outlet of autothermal reformer 311, an outlet of post reformer 312, steam for the autothermal reformer 313, a catalytic combustor 314, and an outlet of cathode 315 were generally maintained, which proves the prevention of thermal shock at the fuel cell anode.

Figure 3B:
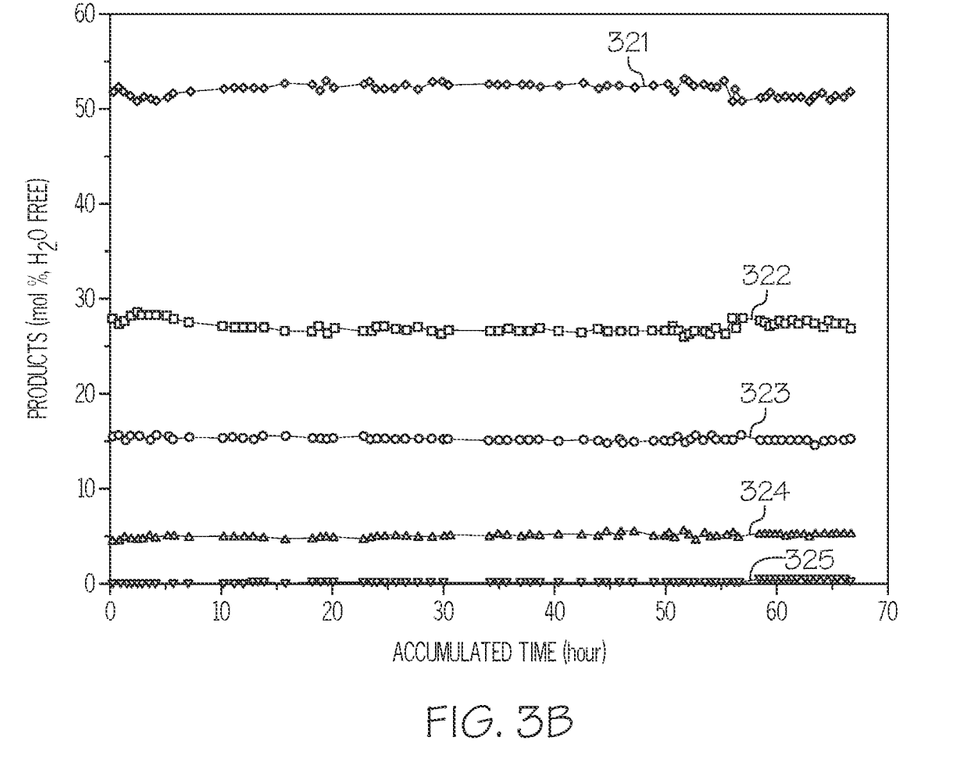
FIG. 3B graphically depicts a differential molar flow rate (y-axis) of $N_2$, $H_2$, $CO_2$, CO, and $CH_4$ in an outlet stream of post-reformer as a function of the logarithm of time (x-axis) during the cycling tests, according to Example 2.
Figure 3C:
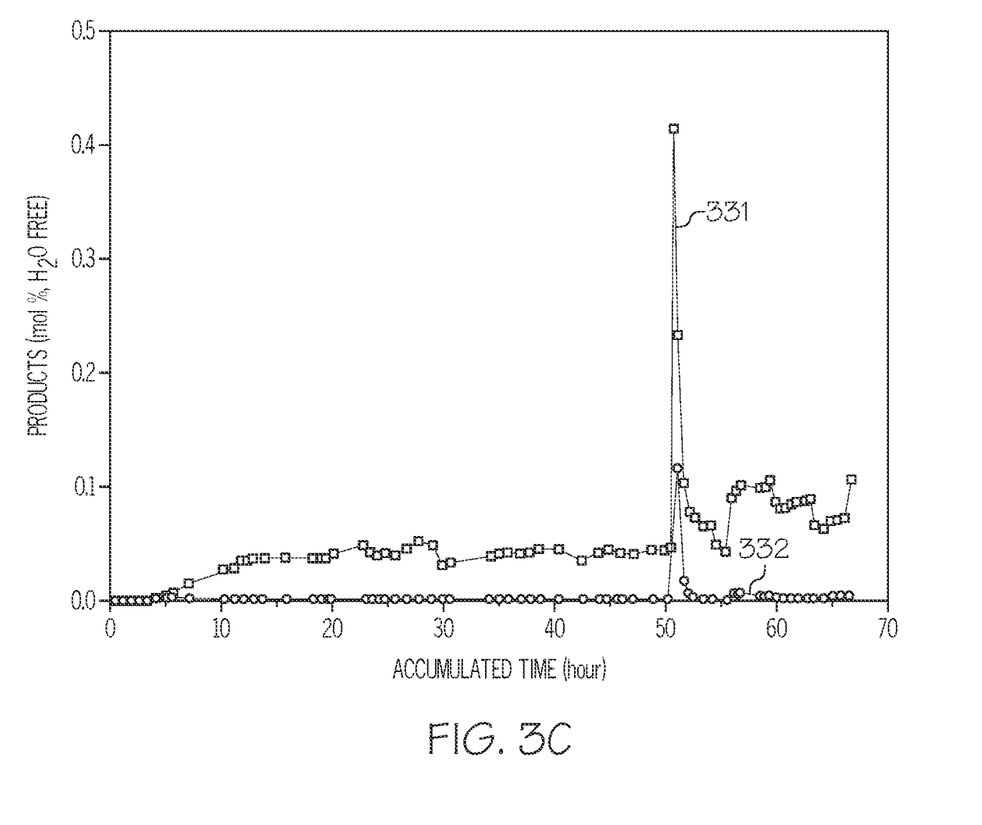
FIG. 3C graphically depicts a differential molar flow rate (y-axis) of $CH_4$, and $C_{2+}$ in an outlet stream of post-reformer as a function of the logarithm of time (x-axis) during the cycling tests, according to Example 2.

Further during the cycling tests, a differential molar flow rate of $N_2$ 321, $H_2$ 322, $CO_2$ 323, CO 324, and $CH_4$ 325 in the outlet stream of post-reformer were measured and depicted in FIG. 3B and a differential molar flow rate of $C_2H_4$ 331, $C_{2+}$ 332 in the outlet stream of post-reformer were measured and depicted in FIG. 3C. FIGS. 3B and 3C show the stable operation of the autothermal reformer during the cycling tests. Products, such as $N_2$ 321, $H_2$ 322, $CO_2$ 323, CO 324, $CH_4$ 325, and $C_2H_4$ 331 showed stable flow rates at the autothermal reformer.

Increase of the $C_2H_4$ 331 and $C_{2+}$ 332 flow rates at FIG. 3C shows a nozzle clogging problem at the outlet of the autothermal reformer. Total $C_2H_4$ 331 and $C_{2+}$ 332 were increased due to the unstable mixing of diesel and oxidant at the outlet zone, so the test was paused at 51.2 hours. After the nozzle replacement, the autothermal reformer was operated without thermal shock although there was the fuel pump fluctuation (at 51.2-55.4 hours). After the fuel pump fluctuation was fixed, the autothermal reformer was operated without thermal shock during $4^{th}$ cycling test.

A first aspect of the present disclosure is directed to a method of operating a solid oxide fuel cell system comprising: I. contacting a cathode gas comprising oxygen with a heating element to produce a heated cathode gas; II. passing the heated cathode gas through a cathode of a solid oxide fuel cell stack to increase the temperature of the solid oxide fuel cell stack to an operation temperature and reduce the oxygen to oxygen anions; and III. passing an anode gas through an anode of the solid oxide fuel cell stack to initiate the electrochemical oxidation of the oxygen anions within the anode, where step III is initiated when the solid oxide fuel cell stack is heated to an operational temperature.

A second aspect of the present disclosure may include the first aspect, where step III comprises passing the anode gas through an anode gas regulator operable to regulate the volumetric flow of the anode gas through the anode by diverting at least a portion of the anode gas to bypass the solid oxide fuel cell stack.

A third aspect of the present disclosure may include either of the first or second aspects, where the difference between the operational temperature of the solid oxide fuel cell stack and the average temperature of the anode gas is from 0° C. to 50° C.

A fourth aspect of the present disclosure may include any one of the first through third aspects, where the operational temperature of the solid oxide fuel cell stack is from 600° C. to 800° C.

A fifth aspect of the present disclosure may include any one of the first through fourth aspects, where an average temperature of the heated cathode gas is from 600° C. to 800° C.

A sixth aspect of the present disclosure may include any one of the first through fifth aspects, where an average temperature of the anode gas is from 600° C. to 800° C.

A seventh aspect of the present disclosure may include any one of the first through sixth aspects, where the difference between an average temperature of the anode gas and an average temperature of the heated cathode gas is from 0° C. to 50° C.

An eighth aspect of the present disclosure may include any one of the first through seventh aspects, where step III comprises producing the anode gas by the autothermal reforming of a hydrocarbon fuel.

A ninth aspect of the present disclosure may include any one of the first through eighth aspects, where step I comprises passing the cathode gas through a first heat exchanger that receives an unreacted anode gas.

A tenth aspect of the present disclosure may include any one of the first through ninth aspects, where the unreacted anode gas comprises the portion of the anode gas diverted by the anode gas regulator and an unreacted portion of the anode gas passed through the anode.

An eleventh aspect of the present disclosure may include any one of the first through tenth aspects, where step I comprises passing the cathode gas through a second heat exchanger that receives a heated gas.

A twelfth aspect of the present disclosure may include any one of the first through eleventh aspects, where the heated gas comprises the combustion product of an unreacted portion of the cathode gas passed through the cathode and an anode exhaust gas.

A thirteenth aspect of the present disclosure may include any one of the first through twelfth aspects, where the oxygen anions are conducted from the cathode to the anode through a solid electrolyte.

A fourteenth aspect of the present disclosure may include any one of the first through thirteenth aspects, where the anode gas comprises hydrogen and carbon monoxide.

A fifteenth aspect of the present disclosure may include any one of the first through fourteenth aspects, further comprising producing the anode gas through the autothermal reforming of a hydrocarbon fuel.

A sixteenth aspect of the present disclosure is directed to a solid oxide fuel cell system comprising a solid oxide fuel cell stack comprising an anode, a cathode, and a solid electrolyte; a cathode gas source operable to pass a cathode gas through the cathode of the solid oxide fuel cell stack; an anode gas source operable to pass an anode gas through the anode of the solid oxide fuel cell stack, the anode gas source comprising an autothermal reformer operable to produce the anode gas by the autothermal reforming of a hydrocarbon fuel; and an anode gas regulator operable to regulate the flow of the anode gas through the anode of the solid oxide fuel cell stack by diverting at least a portion of the anode gas to bypass the solid oxide fuel cell stack.

A seventeenth aspect of the present disclosure may include the sixteenth aspect, where the cathode gas has an average temperature of from 600° C. to 800° C.

An eighteenth aspect of the present disclosure may include either of the sixteenth or seventeenth aspects, where the cathode gas source comprises a heater comprising a catalytic combustor.

A nineteenth aspect of the present disclosure may include any one of the sixteenth through eighteenth aspects, where the anode gas source comprises a post-reformer disposed on an outlet side of the autothermal reformer.

A twentieth aspect of the present disclosure may include any one of the sixteenth through nineteenth aspects, where the anode gas regulator comprises an inlet valve disposed on an inlet side of the solid oxide fuel cell stack, an outlet valve disposed on an outlet side of the solid oxide fuel cell stack, and a temperature sensor operable to measure the temperature of the solid oxide fuel cell stack.

It will be apparent to a person of ordinary skill in the art that various modifications and variations can be made without departing from the spirit or scope of the present disclosure. Since modifications, combinations, sub-combinations, and variations of the disclosed embodiments incorporating the spirit and substance of the present disclosure may occur to a person of ordinary skill in the art, the scope of the present disclosure should be construed to include everything within the scope of the appended claims and their equivalents.

It is noted that one or more of the following claims utilize the term "where" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure. Rather, the appended claims should be taken as the sole representation of the breadth of the present disclosure and the corresponding scope of the various embodiments described in this disclosure. Further, it will be apparent that modifications and variations are possible without departing from the scope of the appended claims. More specifically, although some aspects of the present disclosure are identified as particularly advantageous, it is contemplated that the present disclosure is not necessarily limited to these aspects.

What is claimed is:

1. A method of operating a solid oxide fuel cell system, the method comprising:
   diverting at least a portion of an anode gas to bypass an inlet to an anode of a solid oxide fuel cell stack by passing the portion of anode gas through an anode gas regulator operable to regulate the volumetric flow of the anode gas through the anode, where the anode gas regulator comprises
      an inlet valve disposed on the anode inlet side of the solid oxide fuel cell stack,
      an outlet valve disposed on an anode outlet side of the solid oxide fuel cell stack, and
      a temperature sensor;
   passing a cathode gas comprising oxygen and an anode discharge through a first heat exchanger to produce a heated cathode gas, wherein the anode discharge comprises the portion of the anode gas diverted by the anode gas regulator and an unreacted portion of the anode gas passed through the anode;
   passing the heated cathode gas through a cathode of the solid oxide fuel cell stack to increase the temperature of the solid oxide fuel cell stack to an operation temperature and reduce the oxygen to oxygen anions; and
   after the solid oxide fuel cell stack is heated to the operational temperature, passing the anode gas through the anode of the solid oxide fuel cell stack to initiate the electrochemical oxidation of the oxygen anions within the anode.

2. The method of claim 1, where the difference between the operational temperature of the solid oxide fuel cell stack and the average temperature of the anode gas is from 0° C. to 50° C.

3. The method of claim 1, where the operational temperature of the solid oxide fuel cell stack is from 600° C. to 800° C.

4. The method of claim 1, where an average temperature of the heated cathode gas is from 600° C. to 800° C.

5. The method of claim 1, where an average temperature of the anode gas is from 600° C. to 800° C.

6. The method of claim 1, where the difference between an average temperature of the anode gas and an average temperature of the heated cathode gas is from 0° C. to 50° C.

7. The method of claim 1, where the anode gas is produced by the autothermal reforming of a hydrocarbon fuel.

8. The method of claim 1, further comprising, prior to passing the heated cathode gas through the cathode, passing the cathode gas or the heated cathode gas through a second heat exchanger that receives a heated gas.

9. The method of claim 8, where the heated gas comprises the combustion product of an unreacted portion of the cathode gas passed through the cathode and an anode exhaust gas.

10. The method of claim 1, where the oxygen anions are conducted from the cathode to the anode through a solid electrolyte.

11. The method of claim 1, where the anode gas comprises hydrogen and carbon monoxide.

12. The method of claim 1, further comprising producing the anode gas through the autothermal reforming of a hydrocarbon fuel.

13. A solid oxide fuel cell system comprising:
   a solid oxide fuel cell stack comprising an anode, a cathode, and a solid electrolyte;
   a cathode gas source operable to pass a cathode gas through the cathode of the solid oxide fuel cell stack;
   an anode gas source operable to pass an anode gas through the anode of the solid oxide fuel cell stack, the anode gas source comprising an autothermal reformer operable to produce the anode gas by the autothermal reforming of a hydrocarbon fuel;
   an anode gas regulator operable to regulate the flow of the anode gas through the anode of the solid oxide fuel cell stack by diverting at least a portion of the anode gas to bypass the solid oxide fuel cell stack, where the anode gas regulator comprises an inlet valve disposed on an inlet side of the solid oxide fuel cell stack, an outlet valve disposed on an outlet side of the solid oxide fuel cell stack, and a temperature sensor operable to measure the temperature of the solid oxide fuel cell stack; and
   a heat exchanger interposed between the cathode gas source and the cathode as well as a downstream portion of the outlet valve and an upstream portion of the inlet valve, wherein the heat exchanger is configured to
      receive the cathode gas from the cathode gas source, and
      receive an anode discharge from the outlet valve, the anode discharge comprising the portion of the anode gas diverted by the anode gas regulator and an unreacted portion of the anode gas passed through the anode.

14. The solid oxide fuel cell system of claim 13, where the cathode gas has an average temperature of from 600° C. to 800° C.

15. The solid oxide fuel cell system of claim 13, where the cathode gas source comprises a heater comprising a catalytic combustor.

16. The solid oxide fuel cell system of claim 13, where the anode gas source further comprises a post-reformer disposed on an outlet side of the autothermal reformer.

* * * * *